United States Patent
Zhou et al.

(10) Patent No.: US 9,985,977 B2
(45) Date of Patent: *May 29, 2018

(54) DIRECT CACHE ACCESS FOR NETWORK INPUT/OUTPUT DEVICES

(71) Applicant: Fortinet, Inc., Sunnyvale, CA (US)

(72) Inventors: Xu Zhou, San Jose, CA (US); Hongbin Lu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/651,274

(22) Filed: Jul. 17, 2017

(65) Prior Publication Data

US 2017/0318031 A1 Nov. 2, 2017

Related U.S. Application Data

(63) Continuation of application No. 15/434,342, filed on Feb. 16, 2017, now Pat. No. 9,712,544, which is a continuation of application No. 15/222,630, filed on Jul. 28, 2016, now Pat. No. 9,584,621, which is a continuation of application No. 14/736,432, filed on (Continued)

(51) Int. Cl.

| G06F 3/00 | (2006.01) |
|---|---|
| H04L 29/06 | (2006.01) |
| H04L 29/08 | (2006.01) |
| G06F 12/14 | (2006.01) |
| G06F 3/06 | (2006.01) |

(52) U.S. Cl.
CPC ...... *H04L 63/1408* (2013.01); *H04L 63/0236* (2013.01); *H04L 63/0272* (2013.01); *H04L 69/22* (2013.01); *G06F 3/065* (2013.01); *G06F 12/145* (2013.01); *H04L 67/2857* (2013.01)

(58) Field of Classification Search
CPC ..... G06F 12/0815; G06F 13/385; H04L 12/66
USPC .......................................................... 710/22
See application file for complete search history.

(56) References Cited

U.S. PATENT DOCUMENTS

| 7,159,077 B2 * | 1/2007 | Tu ....................... G06F 12/0835 |
|---|---|---|
| | | 711/118 |
| 9,264,509 B1 | 2/2016 | Zhou et al. |

(Continued)

OTHER PUBLICATIONS

Non-Final Rejection for U.S. Appl. No. 14/496,237 dated Feb. 10, 2015.

(Continued)

*Primary Examiner* — Titus Wong
(74) *Attorney, Agent, or Firm* — Hamilton, DeSanctis & Cha LLP

(57) ABSTRACT

Methods and systems for improving efficiency of direct cache access (DCA) are provided. According to one embodiment, a set of DCA control settings are defined by a network interface controller (NIC) of a network security device for each of multiple I/O device queues. The control settings specify portions of network packets that are to be copied to a cache of the corresponding CPU. A packet is received by the NIC. The packet is parsed to identify boundaries of portions of the packet and is queued onto an I/O device queue. The packet is then transferred from the I/O device queue to a host memory of the network security device and the specified portions are concurrently copied to the cache of the corresponding CPU based on the control setting associated with the I/O device queue.

20 Claims, 5 Drawing Sheets

Related U.S. Application Data

Jun. 11, 2015, now Pat. No. 9,413,726, which is a continuation of application No. 14/496,237, filed on Sep. 25, 2014, now Pat. No. 9,264,509.

(56) References Cited

U.S. PATENT DOCUMENTS

| | | | |
|---|---|---|---|
| 9,413,726 | B2 | 8/2016 | Zhou et al. |
| 9,584,621 | B2 | 2/2017 | Zhou et al. |
| 9,712,544 | B2 | 7/2017 | Zhou et al. |
| 2002/0194434 | A1 | 12/2002 | Kurasugi |
| 2005/0262235 | A1 | 11/2005 | Childress et al. |
| 2006/0072563 | A1* | 4/2006 | Regnier .............. H04L 49/90 370/389 |
| 2009/0073981 | A1* | 3/2009 | Coyte .............. H04L 45/00 370/392 |
| 2016/0094519 | A1 | 3/2016 | Zhou et al. |
| 2016/0337468 | A1 | 11/2016 | Zhou et al. |
| 2017/0163662 | A1 | 6/2017 | Zhou et al. |

OTHER PUBLICATIONS

Notice of Allowance for U.S. Appl. No. 14/496,237 dated Dec. 31, 2015.
Non-Final Rejection for U.S. Appl. No. 14/736,432 dated Jul. 16, 2015.
Final Rejection for U.S. Appl. No. 14/736,432 dated Nov. 6, 2015.
Notice of Allowance for U.S. Appl. No. 14/736,432 dated Jul. 6, 2016.
Notice of Allowance for U.S. Appl. No. 15/222,630 dated Nov. 25, 2016.
Notice of Allowance for U.S. Appl. No. 15/434,342 dated Jun. 29, 2017.

\* cited by examiner

DIRECT CACHE ACCESS FOR NETWORK INPUT/OUTPUT DEVICES

CROSS-REFERENCE TO RELATED APPLICATIONS

This application is a continuation of U.S. patent application Ser. No. 15/434,342, filed Feb. 16, 2017, which is a continuation of U.S. patent application Ser. No. 15/222,630, filed Jul. 28, 2016, now U.S. Pat. No. 9,584,621 which is a continuation of U.S. patent application Ser. No. 14/736,432, filed Jun. 11, 2015, now U.S. Pat. No. 9,413,726, which is a continuation of U.S. patent application Ser. No. 14/496,237, filed Sep. 25, 2014, now U.S. Pat. No. 9,264,509, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present disclosure generally relate to network traffic processing and memory access. In particular, embodiments of the present disclosure relate to direct cache access (DCA) for directing traffic from Network Input/Output (I/O) devices directly to processor caches.

Description of the Related Art

A typical computer system includes a host processor, a host memory, and a host cache. In existing technologies, memory access has increasingly become the performance bottleneck due to the speed discrepancy between CPU and memory. A central processing unit (CPU) cache is a cache used by the CPU of a computing device to reduce the average time to access memory, also commonly referred to as latency. Data located in cache memory may be accessed in much less time than that located in the host memory as the cache stores relevant data closer to the CPU, which is sufficient to locate the source of incoming data or packets. Thus, a central processing unit (CPU) with a cache memory needs to spend far less time waiting for instructions and operands to be fetched and/or stored.

While a host processor executes application programs that require access to data, the host cache temporarily holds data for use by the processor such that when the host processor needs to read from or write to a location in main memory, it first checks whether a copy of that data is present in the host cache. If so, the processor immediately reads from or writes to the cache, which is much faster than reading from or writing to main memory/host memory.

Direct cache access may be used to avoid system bandwidth overload and bandwidth restrictions by placing the data directly into the processor's cache before, instead of, or in parallel with placing the data into system memory. Direct cache access (DCA) is information processing system protocol that permits data from an input/output (I/O) device to be placed into a corresponding cache based on protocol aware applications.

Even with the advent of DCA, existing solutions are still not able to optimize the amount of data that should be transferred and written into the CPU cache. If less than optimal data is transferred into the CPU cache, cache misses result in memory access penalties. Similarly, if more than needed data is transferred into CPU cache, other relevant data may be evicted from the cache, thereby causing a cache miss and resulting memory access penalties. The current systems and communication techniques therefore result in inefficiencies with respect to performance and speed.

In view of the foregoing, there is a need for improved DCA schemes.

SUMMARY

Methods and systems are described for improving efficiency of direct cache access (DCA). According to one embodiment, a set of DCA control settings are defined by a network interface controller (NIC) of a network security device for each of multiple I/O device queues. The control settings specify portions of network packets that are to be copied to a cache of the corresponding CPU. A packet is received by the NIC. The packet is parsed to identify boundaries of portions of the packet and is queued onto an I/O device queue. The packet is then transferred from the I/O device queue to a host memory of the network security device and the specified portions are concurrently copied to the cache of the corresponding CPU based on the control setting associated with the I/O device queue.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
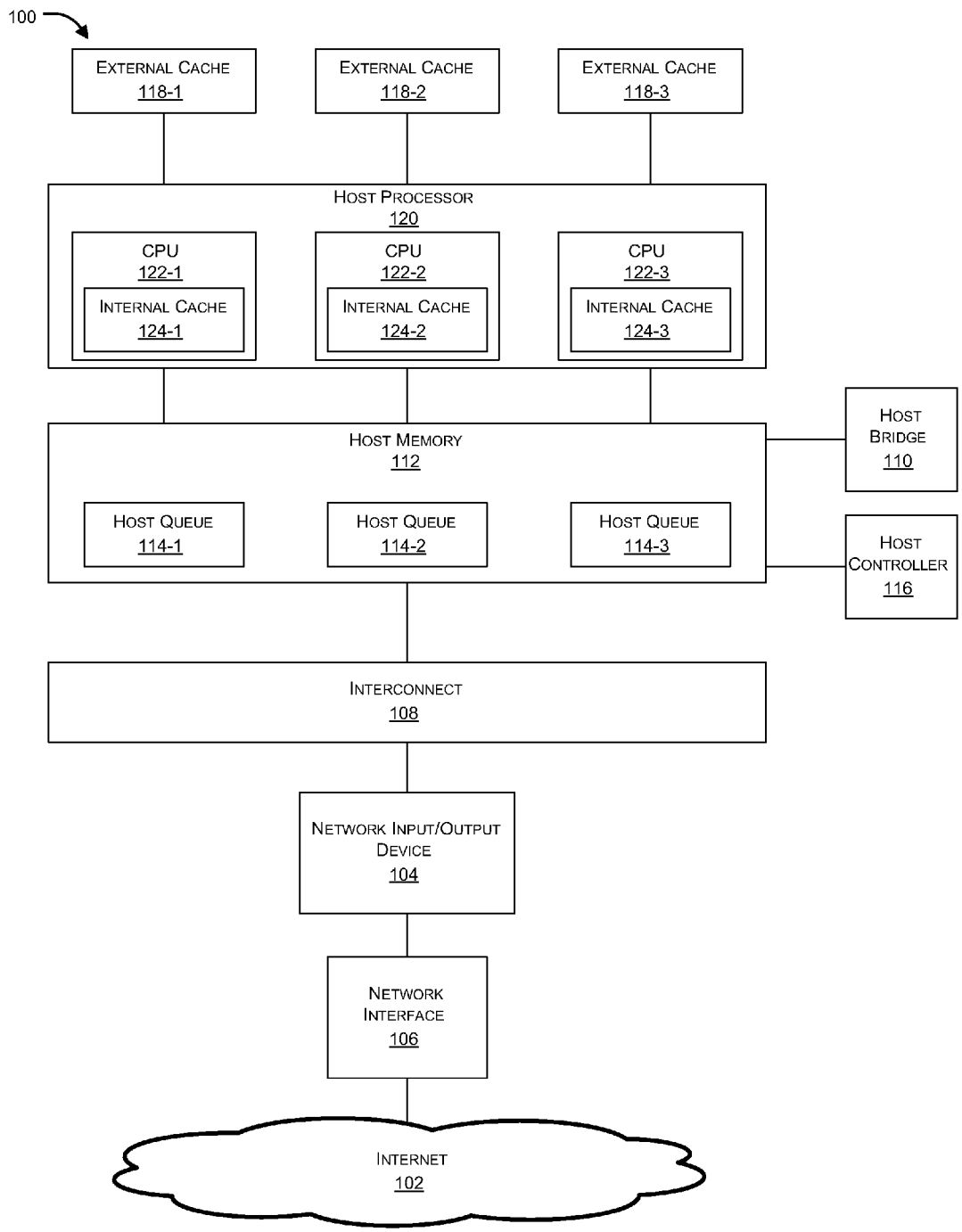
FIG. 1 illustrates an exemplary network architecture in which direct cache access (DCA) may be used in accordance with an embodiment of the present disclosure.

Methods and systems are described for improving efficiency of direct cache access (DCA). According to embodiments of the present disclosure, as the optimal type and amount of packet data cached depends on the protocol of a packet and/or the application (kernel/user) processing the packet, memory access penalties can be minimized by making caching decisions in a protocol and application aware manner. Caching selective and relevant/required packet information of a given packet in CPU cache and not the complete packet may allow other frequently accessed data to remain in the cache, thereby reducing cache misses relating to such data.

According to one embodiment, the system of the present disclosure includes a host processor having one or more central processing units (CPUs), a host memory operatively coupled with the host processor and including one or more host queues, and an intelligent network I/O device having one or more I/O device queues, wherein the intelligent network I/O device, the host processor, and the host memory are operatively coupled with each other. Each I/O device queue can be operatively coupled with one host queue of the host memory, and with one or more CPUs of the host processor such that packets coming into the I/O device queues from various network interfaces of the intelligent network I/O device can be passed on to the corresponding host queues and CPUs, for instance.

According to one embodiment, the system of the present disclosure can include a DCA control module configured to provide DCA controls to one or more I/O device queues to define actual packet information that is of interest to a given application running on a CPU. Such packet information can be, for instance, only the header information (for firewall application, for example), only the payload information, both the header and payload information (for Intrusion Prevention System (IPS) applications, for example), the complete packet, or any part or combination of parts thereof. In an implementation, DCA control module can be implemented in I/O device, and once configured, can result in processing of incoming packets such that only such portions/parts of the packets that are deemed of particular interest are cached concurrently with a write to memory.

According to another embodiment, the system of the present disclosure can include a packet parsing module configured to enable the intelligent network I/O device to parse incoming packets received on network interfaces based on one or more of packet analysis, packet protocol, header format, and payload data information, among other like attributes. System of the present disclosure can further include a packet distribution module configured to distribute the parsed incoming packets to one or more I/O device queues based on one or more of the network interface involved, session details, one or more distribution policies defined by the intelligent network I/O device, the CPU to which the I/O device queue corresponds, the host memory to which the I/O device queue corresponds, protocol of the incoming packets, application(s) to which the incoming packets pertain, among other like parameters.

According to another embodiment, the system of the present disclosure can include a host memory transfer module configured to transfer the distributed queued packets (in parsed format) to corresponding host queues of the host memory. System of the present disclosure can further include a CPU cache write module configured to, concurrent to transfer of distributed queued packets to corresponding host queues, copy/write desired parts of the distributed queued packets (in parsed format) to the corresponding CPU caches based on their respective DCA controls.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Although the present disclosure has been described with the purpose of enabling efficient direct cache access (DCA) control, it should be appreciated that the same has been done merely to illustrate the invention in an exemplary manner and any other purpose or function for which the explained structure or configuration can be used, is covered within the scope of the present disclosure.

Systems and methods are disclosed for, protocol and application aware/specific direct cache access (DCA) control by intelligent network Input/Output (I/O) devices in a networking environment. In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Notably, while embodiments of the present invention may be described using modular programming terminology, the code implementing various embodiments of the present invention are not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

Terminology

Brief definitions of terms used throughout this application are given below.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phrase "network security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

FIG. 1 illustrates an exemplary network architecture 100 in which direct cache access (DCA) may be used in accordance with an embodiment of the present disclosure. According to present example, system/architecture 100 includes a host processor 120 having one or more central processing units (CPUs) 122-1, 122-2, and 122-3, which may be collectively referred to as CPUs 122, with each CPU 122 having an internal cache 124-1, 124-2, and 124-3, which may be collectively referred to as CPU cache 124 or internal cache 124. In an embodiment, host processor 120 can further be coupled to multiple additional/external caches, such as cache 118-1, 118-2, and 118-3, which may be collectively referred to as external cache 118, to provide additional resources during typical/complicated calculation/computing tasks. All these cache memories may be located in close proximity to the host processor 120 in order to help the processor 120 to execute desired applications in a more efficient manner.

System 100 can further include a host memory 112 operatively coupled with the host processor 120 and including one or more host queues 114-1, 114-2, and 114-3, which may be collectively referred to as host queue 114. System 100 can still further include at one or more intelligent network I/O devices, which may be collectively or independently referred to as devices 104, wherein each network I/O device 104 can be operatively coupled with the host processor 120 and with the host memory 112 through an interconnect 108. Those skilled in the art will appreciate that the depicted architecture 100 is exemplary in nature and any other construction/configuration/arrangement of network elements can be incorporated to implement the functionality and DCA control of the present disclosure. Any such construction/configuration therefore is within the scope of the present disclosure.

According to one embodiment, each network I/O device 104 can include one or more I/O device queues (not shown), with each I/O device queue, for instance, being operatively coupled with one host queue 114 of the host memory 112, and one or more CPUs 122 of the host processor 120 such that packets coming into the I/O device queues from network interfaces, such as interface 106, can be passed on to the corresponding host queues 114 and CPUs 122 (their respective internal cache 124), for instance. Each network interface, such as interface 106, can be configured to enable the network I/O devices 104 to send/receive data/communication/packets from a network, such as the Internet 102.

According to one embodiment, system 100 can further include a host bridge 110 that is operatively coupled with host/main memory 112, wherein the host processor 120 transmits data transfer requests to main memory via the host bridge 110. The host bridge 110 can further be operatively coupled with a host controller 116 that implements a protocol to maintain coherence of data stored in each of the processor caches 124. A cache coherence directory (not shown) may also be connected to the host controller 116, also interchangeably referred to as cache coherency controller 116. After receiving requests from host processor 120, the host bridge 110 can identify requests for data to host memory 112 as cacheable or non-cacheable. When the data request from the processor 120 to the host memory 112 through the host bridge 110 is identified as cacheable, the host bridge 110 can request the cache coherence controller/host controller 116 to perform a cache coherence directory lookup to maintain coherence of the data.

According to an exemplary embodiment of present disclosure, each CPU 122 of architecture 100 includes internal cache 124, which is either integrated into the processor chip or is external thereto. Depending on the cache management scheme, cache 124 typically stores the most frequently used data and instructions and improves processor performance by allowing high-speed access to repeatedly used data and instructions, resulting in reduced program execution time. In a computer system with multiple processors, each unit of data is identified as being owned by a particular processor. A CPU such as 124-2 in the system 100 may request a unit of data from host processor 120, wherein the requesting CPU 124-2 may access data to perform either read or write operations. If the requesting CPU 124-2 modifies the data by performing a write, the other CPUs, such as CPUs 124-1 and 124-3, of the host processor 120 may have access to old, unmodified versions of the data. To remedy this problem, each CPU 124 maintains a local record of the addresses cached on the various processors, and the particular "State" of each unit of data associated with the address in the cache coherence directory.

According to another exemplary embodiment, network interface 106 of the present disclosure can relate to a system (software and/or hardware) interface between two pieces of equipment or protocol layers in a network environment. Network interface 106 can enable communication between devices that use different protocols by supplying a common transmission protocol, which may be used instead of the devices' own protocols, or may be used to convert the specific device protocol to the common one. To enable an interface between a LAN and another network, the interface converts protocols and associated code and acts as a buffer between the connected hardware. According to another embodiment of the present disclosure, network interface 106 usually has some form of network addresses, which may consist of a node identifier and/or a port number, wherein the network interface such as 106 can provide standardized functions such as passing messages, connecting and disconnecting one device to other, among other like functions. From the standpoint of a computer data network, network interface 106 is a component that contains all the hardware required to physically connect a computing device to the network. The network interface card could, for example, connect a computing device to an Ethernet, token-ring, FDDI, SONET, or wireless Wi-Fi or Bluetooth network.

According to one embodiment of the present disclosure, protocol aware applications can be configured for operation in a computing environment utilizing a specific communications protocol for exchanging information. For instance, a protocol aware application is one that communicates with resources or interfaces and other applications in a computing environment using a pre-established communications protocol. As a result, coupling can be achieved between the applications and low-level communications services in the computing environment. In this regard, data exchanged between remote connections can be defined specifically for the known protocols according to the program code of the applications.

According to one implementation of system 100, one or more direct cache access (DCA) controls can be implemented at I/O device queues in order to define the actual packet information, e.g., the specific portions thereof, that are of interest to a given application running on a CPU. For instance, assuming that I/O device queue X corresponds to CPU 122-1, which is configured to run a firewall application, wherein firewall applications typically are only interested in understanding and taking actions on packets based on their headers (without analysis of the payload, for instance), a DCA control can be implemented for the queue X to configure and store all or a portion of received packet headers (e.g., one or more specific "header" fields) of each packet that are of importance for the processing being performed by CPU 122-1. Such packet information can include, for instance, only the header information of the packet (for firewall applications, for example), only the payload information of the packet, both the header and the payload of the packet (for IPS applications, for example), the complete packet, or any part or combination of parts thereof. DCA controls can therefore be implemented in an I/O device and once configured, for say each I/O device queue, can result in processing of incoming packets such that only such portions/parts of the packets that are deemed of particular interest for the application at issue are cached concurrently with a write to memory.

In a further exemplary implementation, incoming packets received on network interfaces, such as network interface 106, can be parsed based on one or more of packet analysis, packet protocol, header format, and payload data information, among other like attributes. Such parsed incoming packets can be distributed to one or more I/O device queues based on one or more of the network interface involved, session details, one or more distribution policies defined by the intelligent network I/O device, the CPU to which the I/O device queue corresponds, CPU application, packet protocol, among other like parameters. Once distributed, the queued packets (in parsed format) can be transferred to corresponding host queues 114 of the host memory 112, and desired parts of the packet can also be concurrently copied/written to the corresponding CPU caches 124 based on their respective DCA controls that are configured in the I/O device queues. For instance, each I/O device queue can be configured with one or more different DCA controls, which govern/indicate/define/configure the portion of the packet that is to be sent to the respective CPU depending on the target application being executed on the respective CPU and/or the protocol of the incoming packet, or a combination thereof. As the incoming packets are already parsed by the time the I/O device queues receive them, desired portions of the packets can be easily identified/extracted and sent to the CPU cache 124.

Figure 2:
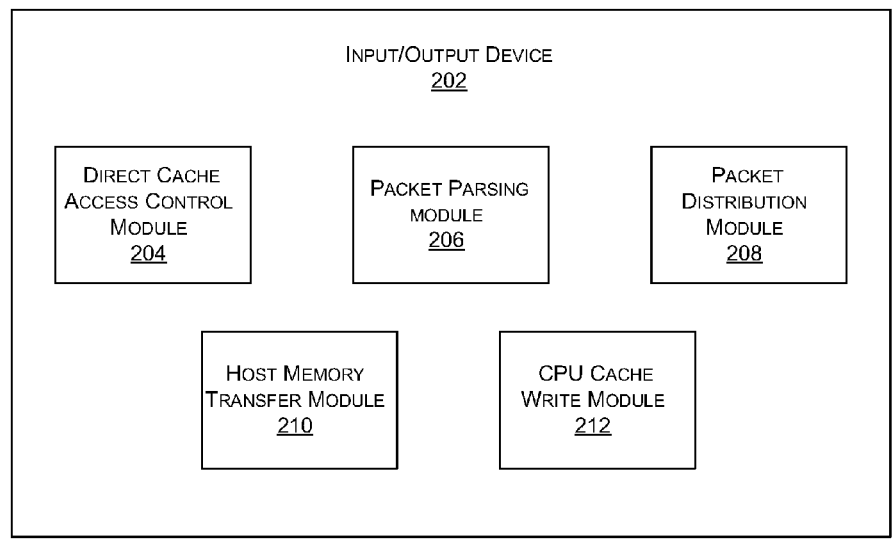
FIG. 2 illustrates exemplary functional modules of an intelligent network Input/Output (I/O) device in accordance with an embodiment of the present disclosure.

FIG. 2 illustrates exemplary functional modules 200 of an intelligent network Input/Output (I/O) device 202 in accordance with an embodiment of the present disclosure. In the context of the present example, intelligent network I/O device 202 includes a direct cache access (DCA) control module 204, a packet-parsing module 206, a packet distribution module 208, a packet host memory transfer module 210, and a CPU cache write module 212. One of ordinary skill in the art will appreciate that the proposed system can include any number of additional modules/sub-modules, which can be implemented in sequence or in parallel. Such modules can also be completely or partially implemented by other entities such as host bridge and/or host controller, and therefore any such change in construction/configuration of the modules is completely within the scope of the instant disclosure.

In an embodiment, direct cache access (DCA) control module 204 can be configured to define one or more DCA controls for one or more I/O device queues that corresponds to respective CPUs of a host processor, wherein the DCA controls configure desired parts/portions of an incoming packet that are to be copied/written to the cache of the CPU based on various conditions. In an embodiment, DCA control module 204 controls the packet information that is to be written from the I/O device queue to the cache of the corresponding CPU. As intelligent network I/O device 202 understands the protocol/format of the incoming packets and also understands the CPU queue to which the packets are forwarded and the applications being run on the CPU, they are able to define rules/policies based on which certain parts of the packets, instead of the complete packet are to be sent to the respective CPU for efficient processing. Settings for DCA controls can be identified based on, among other factors, the functionality/application of the concerned CPU, wherein for instance, when the CPU is running a firewall, it may not be interested in the payload portion of a packet and instead only in the header portion or a part thereof for implementation of its functionality. Similarly, a data intensive application may be more interested in the payload information rather than the header information. In certain cases, applications running on one or more CPUs may only be interested in certain flags/markers contained within or otherwise set as a result of the packet information, and therefore only such flags can be configured as part of the DCA control so as to extract information from the location where such flags are represented in the packet format. In an exemplary implementation, a DCA control can define packet portions to be sent to the respective CPU by means of location of such packet portion. For instance, a DCA control can be defined as "Byte:3-4 and Byte:7", which can then be extracted each time a packet meeting other DCA control criteria, if any, arrives at the I/O device queue.

According to one embodiment, packet parsing module 206 can be configured to parse an incoming packet based on one or more of packet analysis, packet protocol, header format, and payload data information. One would appreciate any known packet format parser can be incorporated to parse the incoming packet in order to recognize various levels of header fields and payloads. Locations, such as beginning offset and ending offset, can also be recorded. For example, a sample Transmission Control Protocol (TCP) packet may be recorded as having 14-bytes of L2 (Ethernet) header, 20-bytes of L3 (IP) header, 20-bytes of L4 (TCP) header, and some bytes of PL (Payload). In another instance, an incoming packet from a network interface can be parsed into multiple portions based on, say its protocol (e.g., TCP, User Datagram Protocol (UDP), among other protocol types) such that each portion is identifiable. Such further portions can include, but are not limited to, payload offset, payload size, payload type, payload length, sequence number, flow key, ethertype, checksum, among other like attributes. In an implementation, packet parsing module 206 can be configured to parse an incoming packet before the packet is placed onto an I/O device queue. In another implementation, on the other hand, packet parsing module 206 can be configured to parse an incoming packet after the packet is placed onto an I/O device queue.

According to one embodiment, packet distribution module 208 can be configured to distribute one or more incoming packets among the I/O device queues based on one or more of network interface involved, session details, distribution policy defined by the I/O device, CPU to which an I/O device queue corresponds, protocol type, packet attributes, host queue to which an I/O device queue corresponds, among other like parameters/factors. In an implementation, packet distribution module 208 can be implemented after the packets have been parsed by the packet parsing module, whereas, in another implementation, the incoming packets can first be distributed among the I/O device queues by means of the packet distribution module 208, and can then be parsed by means of the packet parsing module 206. In an implementation, distribution policy configured to define the manner of distribution of parsed network packets can be dynamically changed for enabling change in the manner in which the forthcoming packets are distributed across the I/O device queues.

According to one embodiment, host memory transfer module 210 can be configured to transfer the parsed incoming packet from the I/O device queue to a corresponding host queue of the host memory. CPU cache write module 212, on the other hand, can be configured to simultaneously or sequentially, consult the DCA control settings for the respective I/O device queue and copy the desired part of the parsed incoming packet from the I/O device queue to the cache of the CPU based on the DCA control settings. In an implementation, when packets are found to be redundant or undesired, I/O device queue can also only copy the packet to a corresponding host queue of the host memory and avoid copying the packet or part thereof into the CPU cache. According to one embodiment, a desired part of the parsed incoming packet can also be copied from the host queue of the host memory to the cache of the CPU based on the DCA control. In an implementation, parsed incoming packets can be copied to the cache of the CPU using a host controller that is operatively coupled with the host memory of the proposed system.

According to one embodiment, intelligent network I/O device 202 can also be configured to control the queue to which the parsed packets are sent/transferred/copied. For instance, when a given CPU is operatively coupled with more than one cache, such as L1, L2, L3, etc, the I/O device can, based on the DCA control and configuration thereof, choose which of the caches the packet portion should be copied to. In another implementation, portions of packets to be copied can also depend on the session identifiers, wherein in a first session, for instance, a packet portion can be copied to the queue of CPU A, and in a second session, a packet portion can be copied to the queue of CPU B. In another implementation, host controller (e.g., host controller 116 of FIG. 1) can be used for copying packet portions to queues of respective CPUs.

In another implementation, at the time of writing a packet/packet segment from an I/O device queue, DCA control settings of the I/O queue can be assessed to determine whether the current write request of the packet segment should be copied to CPU cache or not, and can further tag the parsed incoming packet, or its segment to be copied, before copying the desired part of the packet into the CPU cache. In an implementation, the packet segment, or the parsed packet itself, can be tagged by a host bridge, after which the tagged packet/segment can be copied to the CPU cache.

Figure 3:
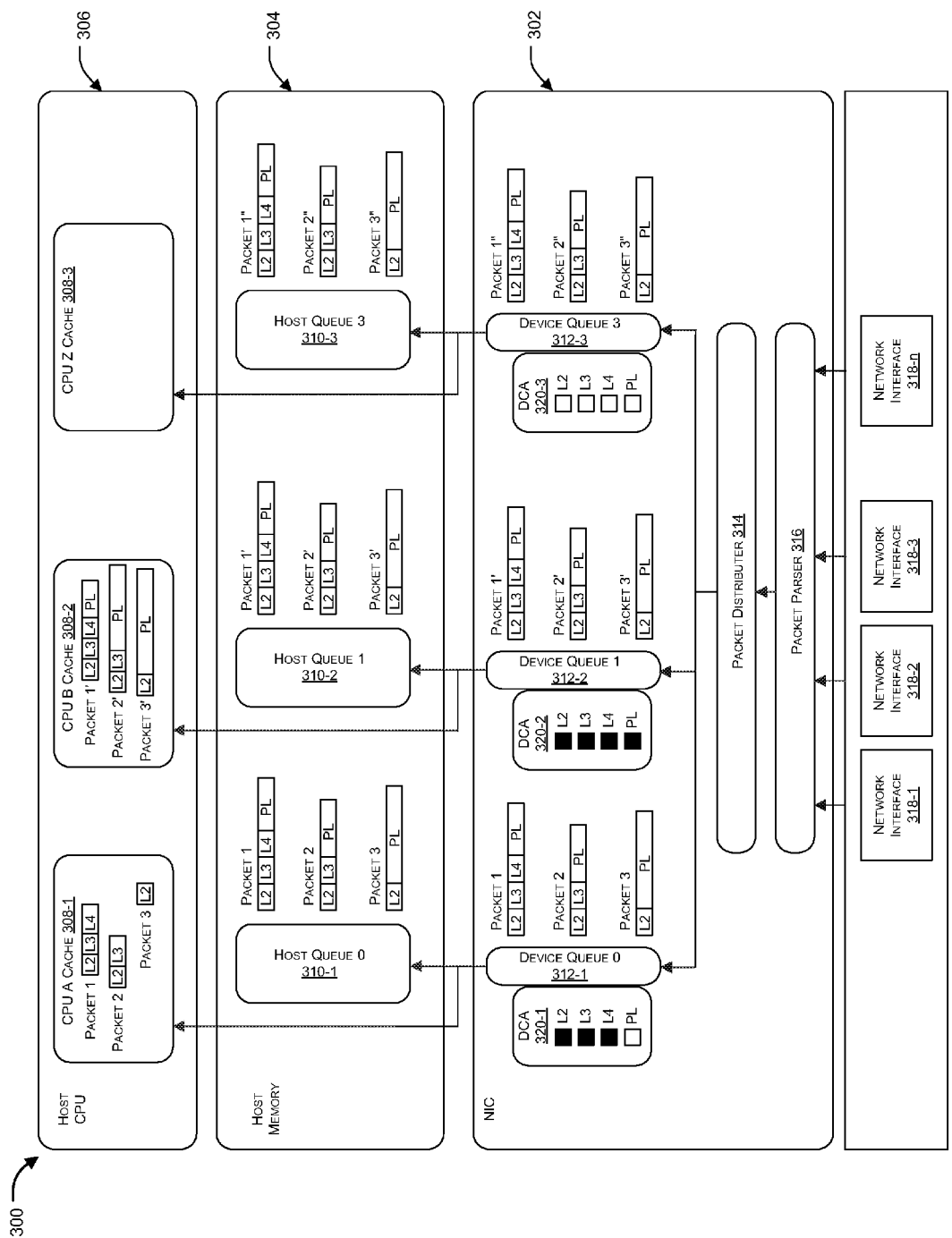
FIG. 3 illustrates an exemplary architectural diagram showing implementation of DCA control in accordance with an embodiment of the present disclosure.

FIG. 3 illustrates an exemplary architectural diagram 300 showing implementation of DCA control in accordance with an embodiment of the present disclosure. In the context of the present example, system 300 includes a network interface controller 302 having multiple I/O device queues 312-1, 312-2, and 312-3, which may be collectively referred to as I/O device queues 312. For simplicity of the present disclosure, NIC 302 may be interchangeably referred to as intelligent network I/O device, or simply as network I/O device or I/O device. I/O device 302 can be operatively coupled with host memory 304 and with a host processor 306.

In an embodiment of the present disclosure, network I/O device 302 can include a packet parser 316 configured to parse incoming packets received on one or more network interfaces, such as 318-1, 318-2, . . . , 318-n, which may be collectively referred to as interface 318, based on one or more of packet analysis, packet protocol, header format, and payload data information. Once an incoming packet is parsed into multiple segments/portions, a packet distributor 314 can be configured to distribute one or more segments/portions of the incoming packet among the I/O device queues 312 based on one or more of network interface involved, session details, distribution policy defined by the I/O device, CPU to which an I/O device queue corresponds, protocol type, packet attributes, host queue to which an I/O device queue corresponds, among other like parameters/factors. For instance, fragmented/segmented/parsed packet 1 can be sent to I/O queue 312-1, and parsed packet 2 can be sent to I/O queue 312-3.

In an aspect, each device queue 312 can be associated with one or more direct cache access (DCA) control settings, such as 320-1, 320-2, and 320-3, which may be collectively referred to as DCA control settings 320, which define one or more parts/portions of an incoming packet that are to be copied/written to cache of the CPU under various circumstances. For instance, device queue 312-1 has an associated DCA control represented by 320-1, device queue 312-2 has an associated DCA control represented by 320-2, and device queue 312-3 has an associated DCA control represented by 320-3. As shown, for device queue 312-1, the DCA control setting 320-1 defines that its corresponding CPU A cache 308-1 requires only the header information including L2, L3, and L4 information (represented by filled checkboxes in 320-1). Similarly, for device queue 312-2, DCA control setting 320-2 defines that its corresponding CPU B cache 308-2 requires both the header information including L2, L3, and L4 as well as payload information PL. Similarly, for device queue 312-3, DCA control setting 320-3 defines that its corresponding CPU Z cache 308-3 requires no information/segment from the incoming packet. Therefore, as intelligent network I/O device 302 understands the protocol/format of the incoming packets P1, P2, . . ., Pn, and also understands the nature and needs of the CPU queue to which the packets are to be forwarded and the applications being run on respective CPU, it is able to define rules/policies specifying various subsets of received packets, instead of the complete packet, that are to be sent to the respective CPUs for efficient processing.

Settings for the DCA control 320 can be identified based on the functionality/application of the concerned CPU 308, wherein for instance, when CPU 308 is running a firewall, it may not be interested in the payload portion of a packet (such as application running on CPU A 308-1) and instead only in the header portion or a part thereof for implementation of its functionality. Similarly, an IPS may be interested in both the header as well as the payload information (such as application running on CPU B 308-2). Those skilled in the art will appreciate that instead of complete header and/or payload information, a part/segment of the information can also be defined in the DCA control settings 320. For instance, instead of the checkboxes shown in DCA control settings 320, ranges of bits or bytes of information from the incoming packet can also be defined for better resolution. Any other representation of the DCA control/settings 320 is completely within the scope of the present disclosure, wherein such settings are configured to define/control/manage the segment/portion of an incoming packet that needs to be shared with the corresponding CPU cache 308.

In an implementation, once DCA control settings 320 for each I/O device queue 312 have been defined and/or configured, each incoming packet, in a parsed format, can be transferred to a corresponding host queue 310 of the host memory 304. For instance, as shown, packet 1, received at device queue 312-1 and having L2+L3+L4+PL, can be transferred to corresponding host queue 310-1 of host memory 304. Similarly, packet 2 and packet 3 received at device queue 312-1 and having L2+L3+PL and L2+PL respectively, can be transferred to corresponding host queue 310-1 of host memory 304.

Similarly, packet 1', packet 2', and packet 3', received at device queue 312-2 and having L2+L3+L4+PL, L2+L3+PL, and L2+PL respectively, can be transferred to corresponding host queue 310-2 of host memory 304. Such a practice can then also be replicated for device queue 312-3, wherein packet 1", packet 2", and packet 3", received at device queue 312-3 and having L2+L3+L4+PL, L2+L3+PL, and L2+PL respectively, can be transferred to corresponding host queue 310-3 of host memory 304. One should appreciate that any other format/protocol/type of the packet can be incorporated and all such changes/configurations are completely within the scope of the instant disclosure.

In implementation, during copying/writing of the packets to corresponding CPU caches 308, a lookup/processing of respective DCA control settings 320 can be done by each device queue 312. Based on such settings 320, the packet segments can then be written to the CPU caches 308 of host processor 306. For instance, as DCA control settings 320-1 for I/O device queue 312-1 defines that only the header information L2/L3/L4 is required to be written to the CPU cache, for packet 1 that has L2+L3+L4+PL, only the header portion of the packet (e.g., L2+L3+L4) is written to the corresponding CPU cache 308-1. Similarly, for packet 2 that has L2+L3+PL, only the header information (e.g., L2+L3) is written to the corresponding CPU cache 308-1. On the same lines, for packet 3 that has L2+PL, only the header information (e.g., L2) is written to the corresponding CPU cache 308-1. Such a process can then be repeated for all other I/O device queues 312-2 and 312-3 as well, wherein, for instance, as DCA control settings 320-3 for queue 312-3 defines no information (neither payload nor header) (maybe because the application running on CPU Z does not benefit from caching packet information) to be sent to the corresponding CPU cache 308-3, the CPU cache 308-3 is empty irrespective of the incoming packet and format/configuration thereof.

Figure 4:
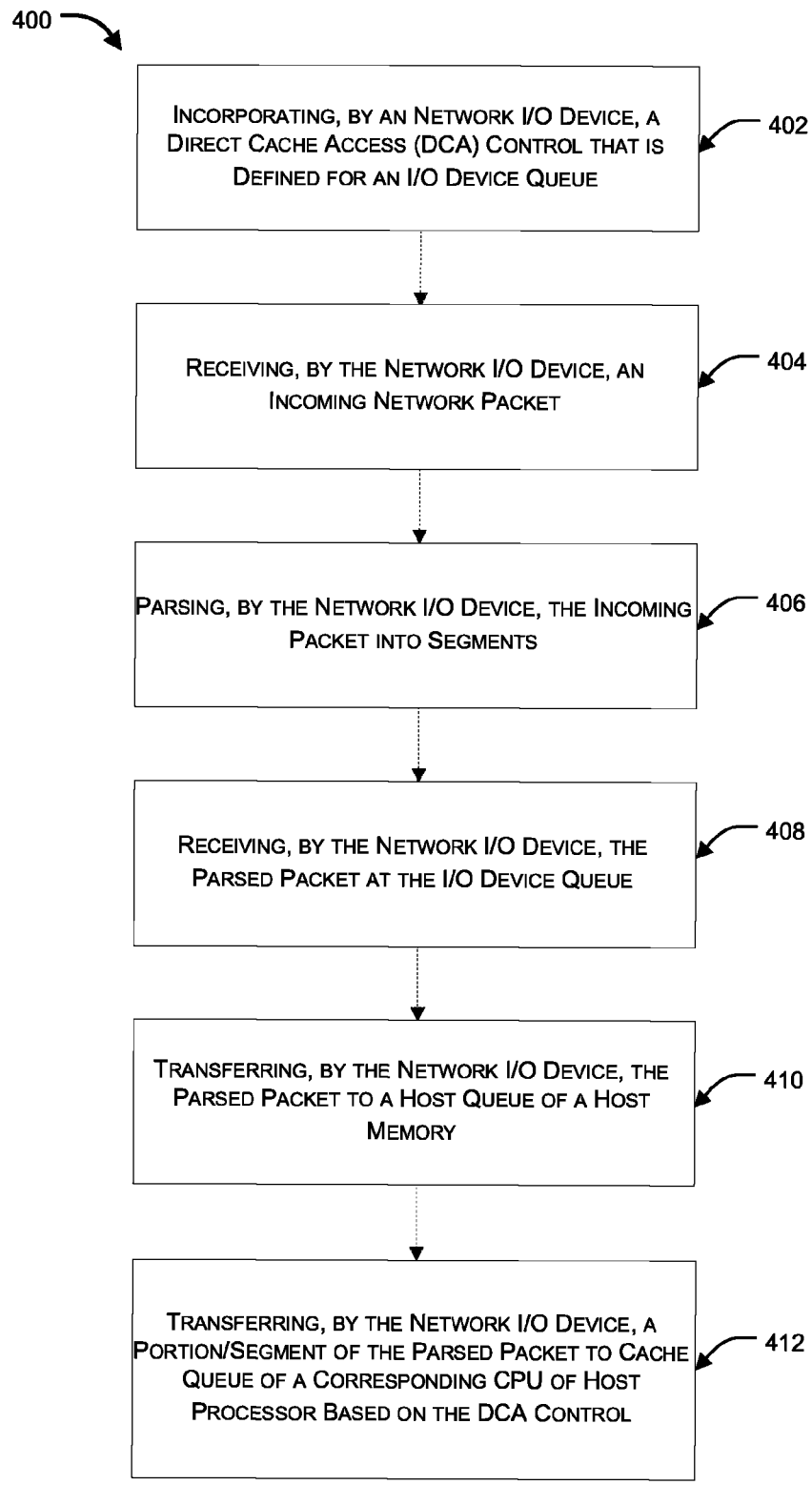
FIG. 4 is a flow diagram illustrating DCA control processing in accordance with an embodiment of the present invention.

FIG. 4 is a flow diagram 400 illustrating DCA control processing in accordance with an embodiment of the present invention. At step 402, a direct cache access (DCA) control can be configured for each I/O queue of an intelligent network I/O device, wherein the DCA control configures one or more parts/segments of an incoming packet that are to be copied to a corresponding CPU cache. At step 404, an incoming network packet is received, and at step 406, each incoming network packet can be parsed by the I/O device, say into header segments, payload segments, or any other part or combination thereof, after which, at step 408, the parsed incoming packet can be sent to/distributed among the I/O device queues. At step 410, the parsed incoming packet can be transferred to a corresponding host queue of host memory, and at step 412, based on the DCA control configured for the I/O queue in context, the one or more portions/segments of the parsed packet can be identified based on the configured DCA control and transferred to the cache queue of the corresponding CPU of host processor. In an implementation, both the steps 410 and 412 can be configured to be performed concurrently, whereas, in another implementation, the steps can be conducted serially. In another implementation, portion/segments of the parsed packet to be copied to the CPU cache can be transferred from the host queue of the host memory, or can be transferred from a host controller, or any other network element/entity configured to exact/retreive the desired portion/segment and send the same to the respective/corresponding CPU cache.

Figure 5:
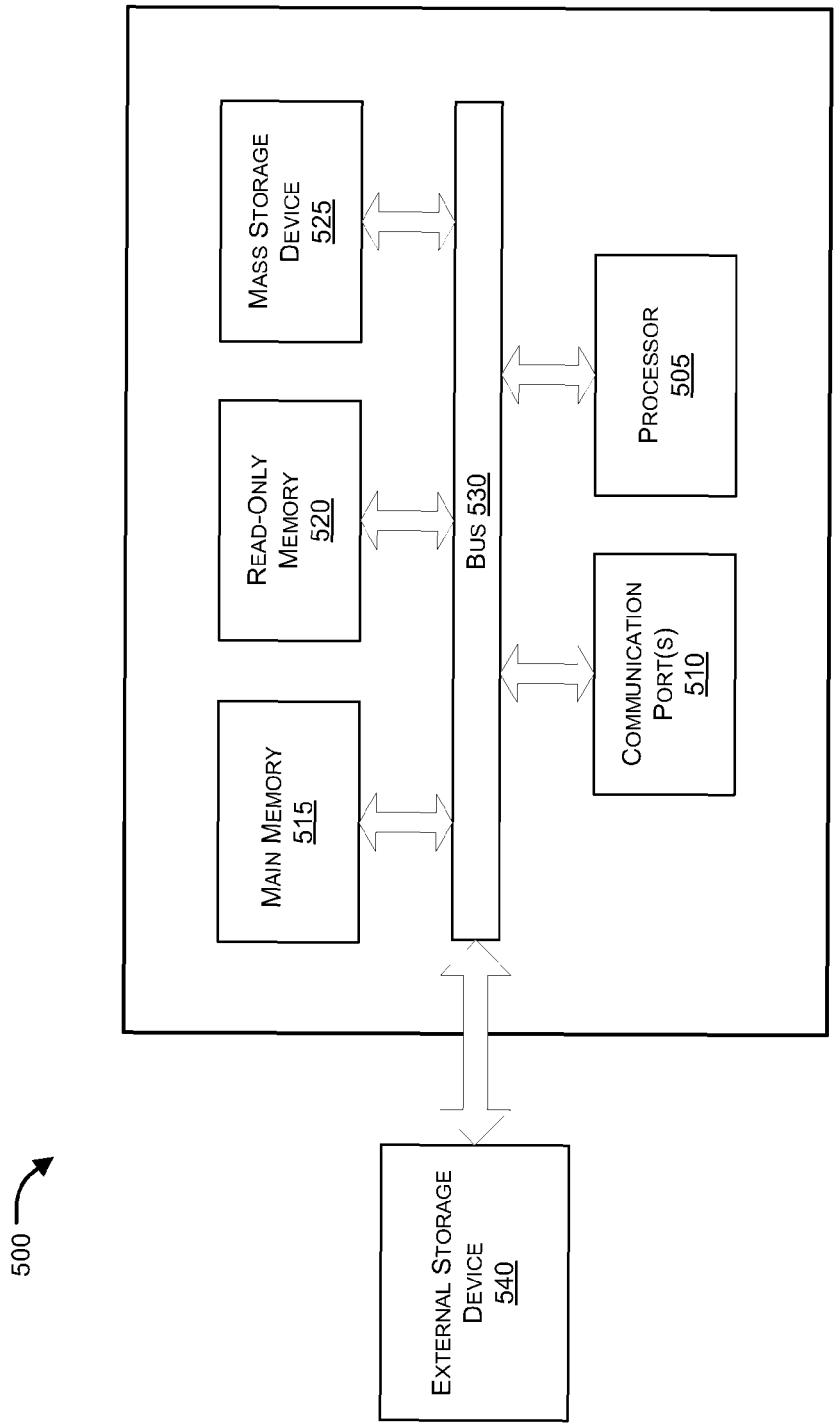
FIG. 5 is an exemplary computer system in which or with which embodiments of the present invention may be utilized.

FIG. 5 is an exemplary computer system 500 with which embodiments of the present disclosure may be utilized. Computer system 500 may represent or form a part of a network appliance, a network security device (e.g., a firewall an IPS) server or a client workstation. Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method comprising:
running a first network security application on a first central processing unit (CPU) of a plurality of CPUs of a network security appliance;
running a second network security application on a second CPU of the plurality of CPUs;
defining, by a network interface controller (NIC) of the network security appliance, a first direct cache access (DCA) control for a first I/O device queue of a plurality of I/O device queues of the NIC corresponding to the first CPU, wherein the first DCA control specifies a first set of one or more portions of an Internet Protocol (IP) packet queued on the first I/O device queue that are to be copied to a cache of the first CPU responsive to transfer of the IP packet from the first I/O device queue to a memory accessible by the plurality of CPUs;
defining, by the NIC, a second DCA control for a second I/O device queue of the plurality of I/O device queues corresponding to the second CPU, wherein the second DCA control specifies a second set of one or more portions of an IP packet queued on the second I/O device queue that are to be copied to a cache of the second CPU responsive to transfer of the IP packet from the second I/O device queue to the memory;
receiving, by the NIC, an IP packet;
identifying, by the NIC, boundaries of portions of the received IP packet by parsing the received IP packet; and
facilitating parallel processing of appropriate portions of the received IP packet by the first network security application and the second network security application by:
queuing, by the NIC, the received IP packet on the first I/O device queue;
queuing, by the network I/O device, the received IP packet on the second I/O device queue;
copying, by a controller associated with the memory, the first set of one or more portions of the received IP packet to the cache of the first CPU based on the first DCA control before, instead of or concurrently with transfer of the received IP packet from the first I/O device queue to the memory; and
copying, by the controller, the second set of one or more portions of the received IP packet to the cache of the second CPU based on the second DCA control before, instead of or concurrently with transfer of the received IP packet from the second I/O device queue to the memory.

2. The method of claim 1, wherein the network security appliance comprises a unified threat management (UTM) appliance.

3. The method of claim 2, wherein the first network security application comprises a firewall application.

4. The method of claim 3, wherein the first set of one or more portions comprise fields within one or more headers of the received IP packet.

5. The method of claim 4, wherein the one or more headers include an Ethernet header.

6. The method of claim 4, wherein the one or more headers include an IP header.

7. The method of claim 4, wherein the one or more headers include a Transmission Control Protocol (TCP) header.

8. The method of claim 4, wherein the first DCA control specifies the first set of one or more portions with reference to byte offsets within the IP packet queued on the first I/O device queue.

9. The method of claim 2, wherein the second network security application comprises an intrusion prevention system (IPS) application.

10. The method of claim 9, wherein the second set of one or more portions comprise fields within one or more headers of the received IP packet and a payload of the received IP packet.

11. A network security appliance comprising:
a plurality of central processing units (CPUs);
a memory, accessible to the plurality of CPUs, including one or more host queues;
a network interface controller (NIC), coupled to the memory, including a plurality of queues;
wherein a first network security application is executed by a first CPU of the plurality of CPUs;
wherein a second network security application is executed by a second CPU of the plurality of CPUs;
wherein a first direct cache access (DCA) control, associated with a first I/O device queue of the plurality of queues, specifies a first set of one or more portions of an Internet Protocol (IP) packet queued on the first queue that are to be copied to a cache of the first CPU;
wherein a second direct cache access (DCA) control, associated with a second I/O device queue of the plurality of queues, specifies a second set of one or more portions of an IP packet queued on the second queue that are to be copied to a cache of the second CPU;

wherein parallel processing by the first network security application and the second network security application of appropriate portions of an received IP packet is facilitated by:
- queuing the received IP packet on the first I/O device queue;
- queuing the received IP packet on the second I/O device queue;
- copying, by a controller associated with the memory, the first set of one or more portions of the received IP packet to the cache of the first CPU based on the first DCA control before, instead of or concurrently with transfer of the received IP packet from the first I/O device queue to the memory; and
- copying, by the controller, the second set of one or more portions of the received IP packet to the cache of the second CPU based on the second DCA control before, instead of or concurrently with transfer of the received IP packet from the second I/O device queue to the memory.

12. The network security appliance of claim 11, wherein the network security appliance comprises a unified threat management (UTM) appliance.

13. The network security appliance of claim 12, wherein the first network security application comprises a firewall application.

14. The network security appliance of claim 13, wherein the first set of one or more portions comprise fields within one or more headers of the received IP packet.

15. The network security appliance of claim 14, wherein the one or more headers include an Ethernet header.

16. The network security appliance of claim 14, wherein the one or more headers include an IP header.

17. The network security appliance of claim 14, wherein the one or more headers include a Transmission Control Protocol (TCP) header.

18. The network security appliance of claim 14, wherein the first DCA control specifies the first set of one or more portions with reference to byte offsets within the IP packet queued on the first I/O device queue.

19. The network security appliance of claim 12, wherein the second network security application comprises an intrusion prevention system (IPS) application.

20. The network security appliance of claim 19, wherein the second set of one or more portions comprise fields within a header of the received packet and a payload of the received packet.

* * * * *